US012795297B2

(12) United States Patent
Lee et al.

(10) Patent No.: US 12,795,297 B2
(45) Date of Patent: Nov. 10, 2026

(54) EARBUD SUPPORTING VOICE ACTIVITY DETECTION AND RELATED METHOD

(71) Applicant: LG ELECTRONICS INC., Seoul (KR)

(72) Inventors: Sangwon Lee, Seoul (KR); Dongsung Shin, Seoul (KR); Yehan Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 177 days.

(21) Appl. No.: 18/729,478

(22) PCT Filed: Jan. 17, 2022

(86) PCT No.: PCT/KR2022/000825
§ 371 (c)(1),
(2) Date: Jul. 16, 2024

(87) PCT Pub. No.: WO2023/136385
PCT Pub. Date: Jul. 20, 2023

(65) Prior Publication Data

US 2025/0119686 A1 Apr. 10, 2025

(51) Int. Cl.
*H04R 3/00* (2006.01)
*G02B 27/01* (2006.01)
*G10L 25/78* (2013.01)

(52) U.S. Cl.
CPC .......... *H04R 3/005* (2013.01); *G02B 27/017* (2013.01); *G10L 25/78* (2013.01); *H04R 2430/01* (2013.01); *H04R 2460/13* (2013.01)

(58) Field of Classification Search
CPC H04R 3/005; H04R 2430/01; H04R 2460/13; G02B 27/017; G10L 25/78
USPC .......................................................... 381/107
See application file for complete search history.

(56) References Cited

U.S. PATENT DOCUMENTS

2009/0264161 A1 10/2009 Usher et al.
2013/0278631 A1* 10/2013 Border ................ G06F 3/04842 345/633
2019/0295554 A1 9/2019 Lesso

FOREIGN PATENT DOCUMENTS

KR 1020120125986 11/2012
KR 1020150080645 7/2015
KR 1020190094131 8/2019

OTHER PUBLICATIONS

PCT International Application No. PCT/KR2022/000825, International Search Report dated Oct. 13, 2022, 12 pages.

* cited by examiner

*Primary Examiner* — Sean H Nguyen
(74) *Attorney, Agent, or Firm* — LEE, HONG, DEGERMAN, KANG & WAIMEY

(57) ABSTRACT

An embodiment relates to an earbud which supports voice activity detection (VAD), the earbud comprising: a first filter unit for filtering a first signal input through a microphone; a first VAD unit for performing voice activity detection on a signal which has passed through the first filter unit; a second filter unit for filtering a second signal input through a bone conduction voice pick up (VPU) sensor; a second VAD unit for performing voice activity detection on a signal which has passed through the second filter unit; and a determination unit for comparing a detection result of the first VAD unit and a detection result of the second VAD unit to determine whether a voice activity is performed.

19 Claims, 8 Drawing Sheets

EARBUD SUPPORTING VOICE ACTIVITY DETECTION AND RELATED METHOD

CROSS-REFERENCE TO RELATED APPLICATION(S)

This application is the National Stage filing under 35 U.S.C. 371 of International Application No. PCT/KR2022/000825, filed on Jan. 17, 2022, the contents of which are all incorporated by reference herein in its entirety.

TECHNICAL FIELD

The following description relates to an earbud and a related method that support voice activity detection (VAD) by eliminating noise and malfunctions due to noise.

BACKGROUND

An earbud is a device that is, by wire or wirelessly, to various types of electronic devices, such as portable media players, smartphones, tablet computers, laptop computers, stereo systems, and other types of devices, to provide sound output from a corresponding electronic device to a user.

A wired earbud includes one or more small speakers positioned above, inside, or near the ears of a user, structural components that hold the speakers in position, and a cable that electrically connects the earbud to an electronic device. A wireless earbud may be a wireless device that does not include a cable but instead wirelessly receives a stream of audio data from a wireless sound source.

DISCLOSURE

Technical Problem

An object of the present disclosure is to provide an earbud, a head mounted display (HMD), and a related method that perform voice activity detection (VAD) by simultaneously using a voice pick up (VPU) sensor and an earbud internal microphone.

Technical Solution

According to an embodiment, an earbud for supporting voice activity detection (VAD) includes a first filter unit configured to filter a first signal input through a microphone, a first VAD unit configured to perform VAD on a signal passing through the first filter unit, a second filter unit configured to filter a second signal input through a bone conduction voice pick up (VPU) sensor, a second VAD unit configured to perform VAD on a signal passing through the second filter unit, and a determination unit configured to compare a detection result of the first VAD unit and a detection result of the second VAD unit to determine whether there is utterance.

According to an embodiment, a method of determining voice activity detection (VAD) includes filtering a first signal input through a microphone, performing VAD on the filtered first signal, filtering a second signal input through a bone conduction voice pick up (VPU) sensor, performing VAD on the filtered second signal, and comparing a VAD detection result related to the first signal and a VAD detection result related to the second signal to determine whether there is utterance.

The first VAD unit and the second VAD unit may simultaneously detect VAD.

The detection result of the first VAD unit and the detection result of the second VAD unit may be either detection of utterance or non-detection of utterance, and the determination unit may determine that there is utterance when both the detection result of the first VAD unit and the detection result of the second VAD unit are detection of utterance.

The first filter unit and the second filter unit may include a high pass filter (HPF).

The microphone may be muted based on that the determination unit determines whether there is utterance.

Based on that the determination unit determines that there is utterance, content being played on the earbud may be stopped.

A volume of the earbud may be lowered to a preset level based on that the determination unit determines that there is utterance.

The first filter unit, the second filter unit, the first VAD unit, the second VAD unit, and the determination unit may be provided in a digital signal processor (DSP) unit, and the DSP may be provided in the earbud.

The microphone and the bone conduction VPU sensor may be provided in the earbud.

The first signal may include a digital signal obtained by passing an analog signal input through the microphone through a first ADC, and the second signal may include a digital signal obtained by passing an analog signal input through the bone conduction VPU sensor through a first ADC.

According to an embodiment, a head mounted display (HMD) for supporting voice activity detection (VAD) includes a display unit configured to provide an image to a user, a wearing unit configured to allow the display unit to be worn on a head of a user, an earbud configured to provide a sound related to the image to the user, a first filter unit configured to filter a first signal input through a microphone, a first VAD unit configured to perform VAD on a signal passing through the first filter unit, a second filter unit configured to filter a second signal input through a bone conduction voice pick up (VPU) sensor, a second VAD unit configured to perform VAD on a signal passing through the second filter unit, and a determination unit configured to compare a detection result of the first VAD unit and a detection result of the second VAD unit to determine whether there is utterance.

The first filter unit, the second filter unit, the first VAD unit, the second VAD unit, and the determination unit may be provided in a DSP unit, and the DSP unit may be provided in either the HMD or the earbud.

The microphone and the bone conduction VPU sensor may be provided in the earbud.

The first VAD unit and the second VAD unit may simultaneously detect VAD.

The detection result of the first VAD unit and the detection result of the second VAD unit may be either detection of utterance or non-detection of utterance, and the determination unit may determine that there is utterance when both the detection result of the first VAD unit and the detection result of the second VAD unit are detection of utterance.

Based on that the determination unit determines that there is utterance, content being played on the earbud may be stopped.

The microphone may be muted based on that the determination unit determines whether there is utterance.

Based on that the determination unit determines that there is utterance, content being played on the earbud may be stopped.

A volume of the earbud may be lowered to a preset level based on that the determination unit determines that there is utterance.

According to an embodiment, a method of determining voice activity detection (VAD) includes filtering a first signal input through a microphone, performing VAD on the filtered first signal, filtering a second signal input through a bone conduction voice pick up (VPU) sensor, performing VAD on the filtered second signal, and comparing a VAD detection result related to the first signal and a VAD detection result related to the second signal to determine whether there is utterance.

Advantageous Effects

According to an embodiment, whether there is utterance may be accurately determined by simultaneously using a microphone and a bone conduction voice pick up (VPU).

User experience may be improved by accurately performing voice activity detection (VAD) to provide interruption of content being played during VAD, a mute function during a call, and an ambient mode control (ANC) function without malfunction.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
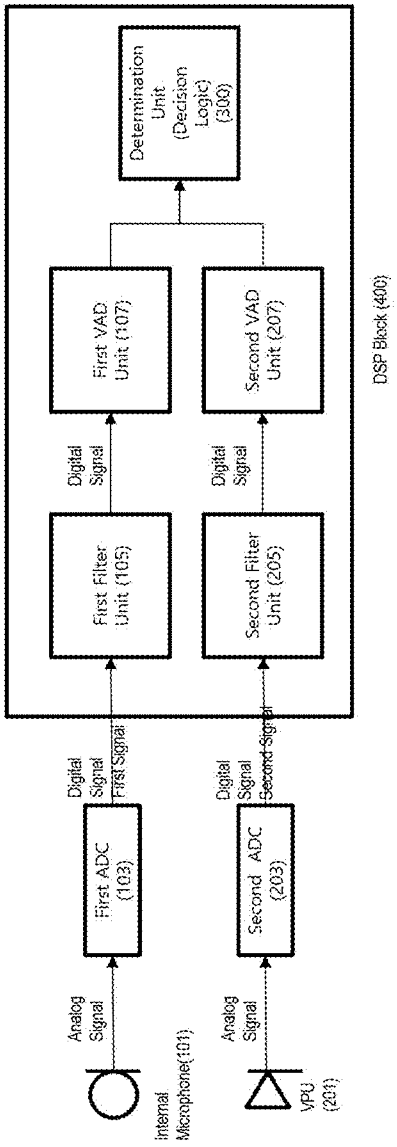
FIG. 1 shows a digital signal processor (DSP) block according to an embodiment.

In various examples of the present disclosure, "/" and "," need to be construed as indicating "and/or". For example, "A/B" may mean "A and/or B". Furthermore, "A, B" may mean "A and/or B". Furthermore, "A/B/C" may mean "at least one of A, B, and/or C". Furthermore, "A, B, and C" may mean "at least one of A, B and/or C".

In various examples of the present disclosure, "or" needs to be construed as indicating "and/or". For example, "A or B" may include "only A", "only B", and/or "both A and B". In other words, "or" needs to be construed as indicating "additionally or alternatively".

Reference will now be made in detail to the exemplary embodiments of the present disclosure with reference to the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

In some instances, well-known structures and devices are omitted in order to avoid obscuring the concepts of the present disclosure and important functions of the structures and devices are shown in block diagram form.

It should be noted that specific terms disclosed in the present disclosure are proposed for convenience of description and better understanding of the present disclosure, and the use of these specific terms may be changed to other formats within the technical scope or spirit of the present disclosure.

An earbud generally has a structure that is relatively vulnerable to a noise environment due to a long distance between the mouth and a microphone. In an effort to overcome this, there is a recent trend of installing a bone conduction voice pick up (VPU) sensor, especially in a premium product.

However, the VPU sensor is a structure that receives a user sound through bone conductivity, and thus may block most of the external noise, which is very advantageous for voice activity detection (VAD). However, the VPU sensor is sensitive to vibration caused by touching and rubbing of earbud devices/equipment, and vigorous movement of a user (running or stomping), and thus malfunction is easily caused.

To compensate for this shortcoming, according to an embodiment of the present disclosure, a VAD unit/module that receives an input of a VPU Sensor and a VAD unit/module that receives an input of an internal microphone may be simultaneously used. Various embodiments of the present disclosure relate to a technology to reduce VAD malfunction by using the fact that input signals of the VPU sensor and the microphone have similar characteristics for speech but have different characteristics for external stimuli and, hereinafter, will be described in detail below.

Referring to FIG. 1, an earbud that supports VAD according to one embodiment may include a first filter unit 105 that filters a first signal input through a microphone, a first VAD unit 107 that performs VAD on a signal passing through the first filter unit 105, a second filter unit 205 that filters a second signal input through a bone conduction VPU sensor, a second VAD unit 207 that performs VAD on a signal passing through the second filter unit, and a determination unit 300 that compares the detection result of the first VAD unit 107 and the detection result of the second VAD unit 207 to determine whether there is utterance.

Here, the first VAD unit and the second VAD unit may simultaneously detect VAD. In other words, the detection results of the first VAD unit and the second VAD unit, which are input to the determination unit, may be the detection results that are simultaneously determined by the first VAD unit and the second VAD unit for the same time period (or within a preset error range). Here, simultaneous may include a preset (allowable) error.

The first signal is a digital signal obtained by passing an analog signal input through the microphone through a first ADC 103, and the second signal is a digital signal obtained by passing an analog signal input through a bone conduction VPU sensor through a second ADC 203. The first filter unit and the second filter unit may each be a high pass filter (HPF). Here, the HPF may remove noise outside a frequency band corresponding to user utterance (e.g., sounds generated by user movement, and sound generated by contact with the earbud (sound of the user rubbing the earbud)). For example, a microphone HPF may be set to remove frequencies below 600 Hz and a VPU HPF may be set to remove frequencies below 100 Hz. However, embodiments of the present disclosure are not necessarily limited to specific frequency values such as 600 Hz and 100 Hz, and other values may be used.

The detection result of the first VAD unit and the detection result of the second VAD unit are either detection of utterance or non-detection of utterance, and the determination unit may determine that there is utterance when all of the detection result of the first VAD unit and the detection result of the second VAD unit are detection of utterance.

Figure 2:
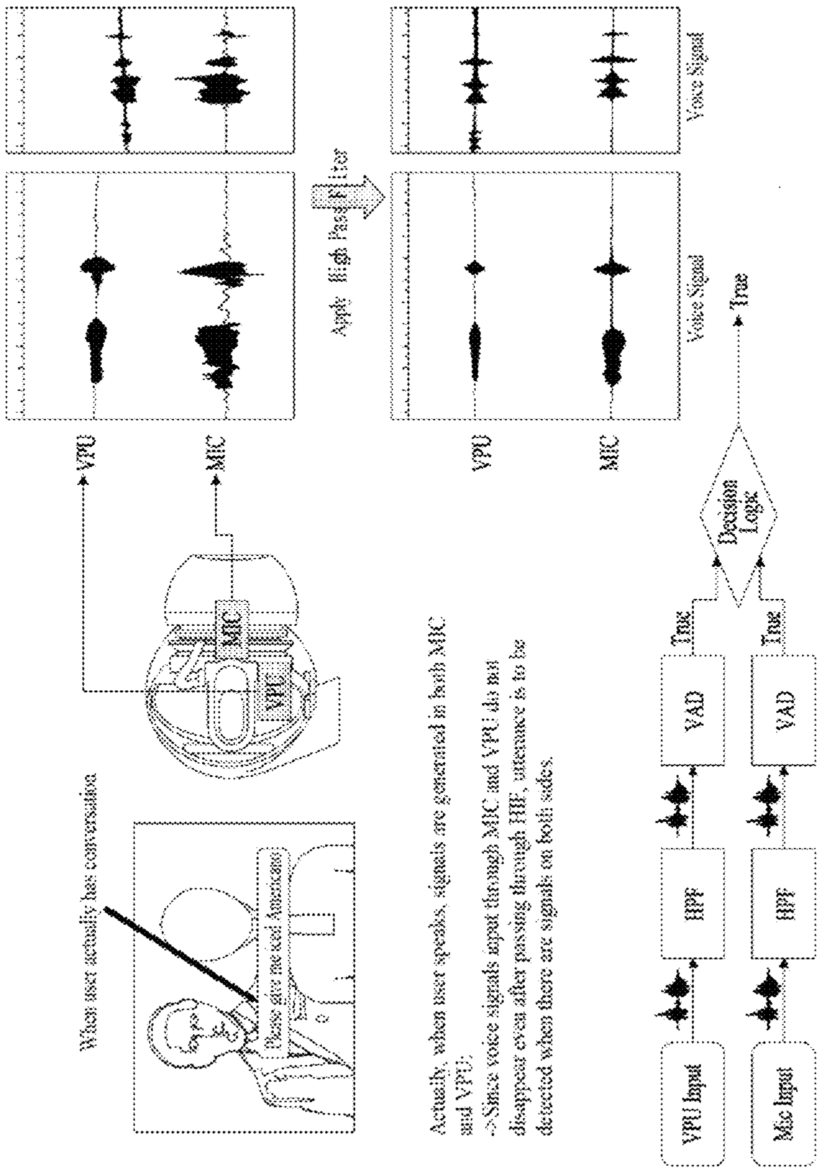
FIGS. 2 to 4 are diagrams to explain voice activity detection (VAD) according to an embodiment.

For example, when the first VAD unit determines the detection result of utterance as true (T), the second VAD unit determines the detection result of utterance as true (T), and the first and second AVD units provide the determination results to the determination unit, all of the detection results of the two VAD units are detection of utterance, and thus the determination unit may determine whether there is utterance as true (T)/utterance through OR operation. FIG. 2 shows a related example. When a user wearing an earbud utters, this is simultaneously input to each of a microphone MIC and a VPU of the earbud, and most of voice signals exist even after passing through the HPF. Accordingly, both the first VAD unit and the second VAD unit output the detection result of utterance as true, and the determination unit that receives this outputs the final utterance determination result as true.

In contrast, when any one of the first VAD unit and the second VAD unit determines that the detection result of utterance is false (F) and provides this to the determination unit, not all detection results of utterance are T, and thus the determination unit may determine whether there is utterance as F.

Figure 3:
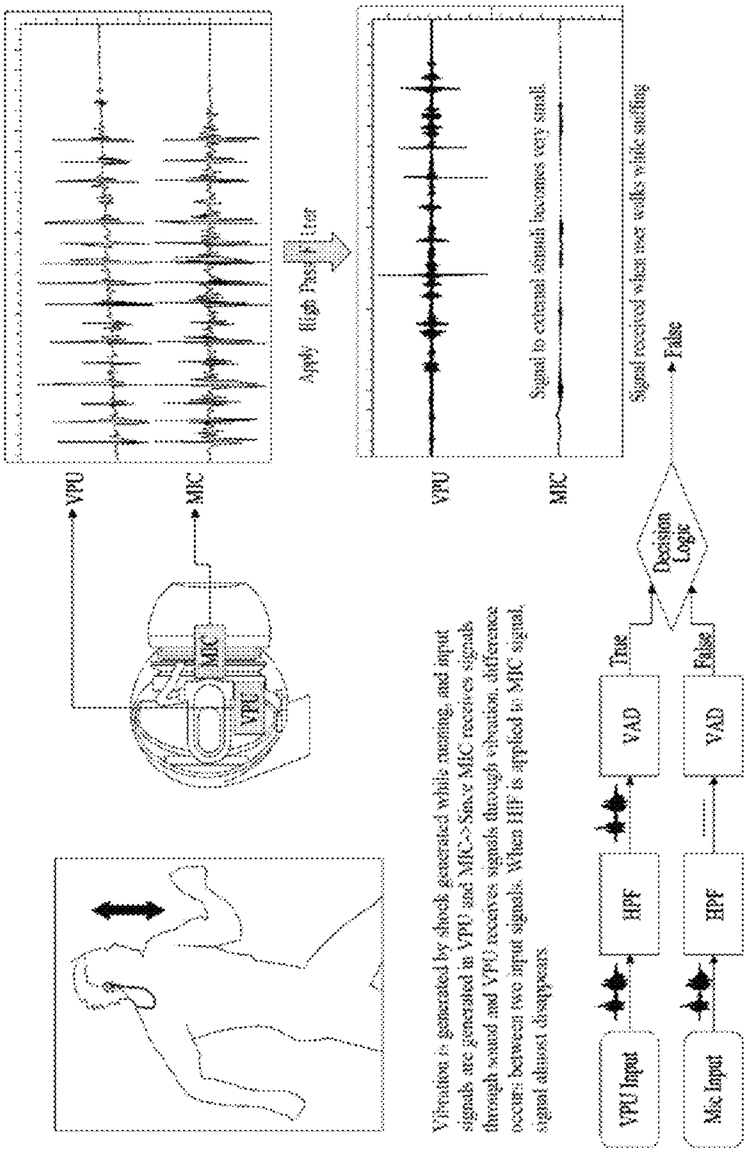
Figure 4:
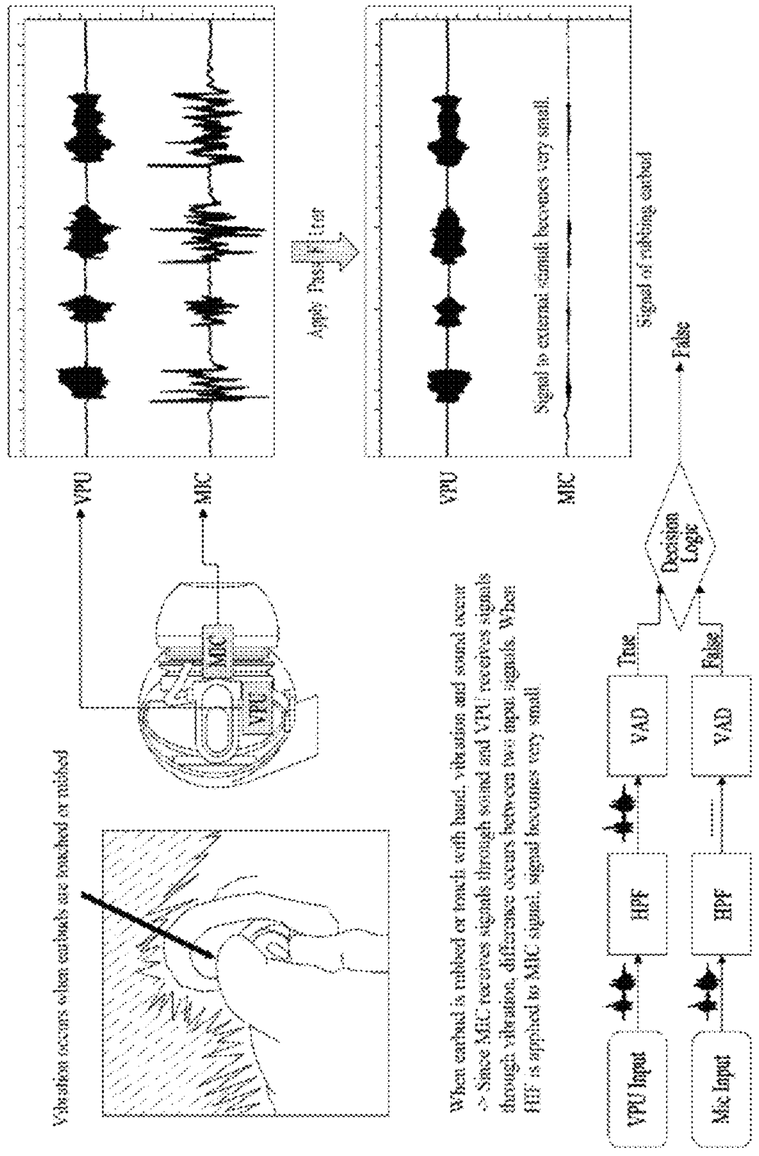

This example is shown in FIGS. 3 and 4. FIG. 3 shows a case in which vibration is generated due to shock generated while a user of an earbud runs and an input signal is generated to a VPU and a microphone MIC. Referring to FIG. 3, a signal input to the microphone from among the signals input as such is removed while passing through the HPF, and the first VAD unit determines the detection result of utterance as false (F). Even if the signal input through a bone conduction VPU sensor passes through the HPF, a signal exists and the detection result of utterance is T. Therefore, the detection results of utterance are not all T, and thus the determination unit outputs the determination result of utterance as F.

FIG. 4 shows a case of sound generated when a user of an earbud touches or rubs the earbud. This sound may exist even if the signal input to the microphone MIC passes through the HPF, but the signal input to the bone conduction VPU sensor may be removed from the HPF. Therefore, the detection results of utterance are not all T, and thus the determination unit outputs the determination result of utterance as F.

Figure 5:
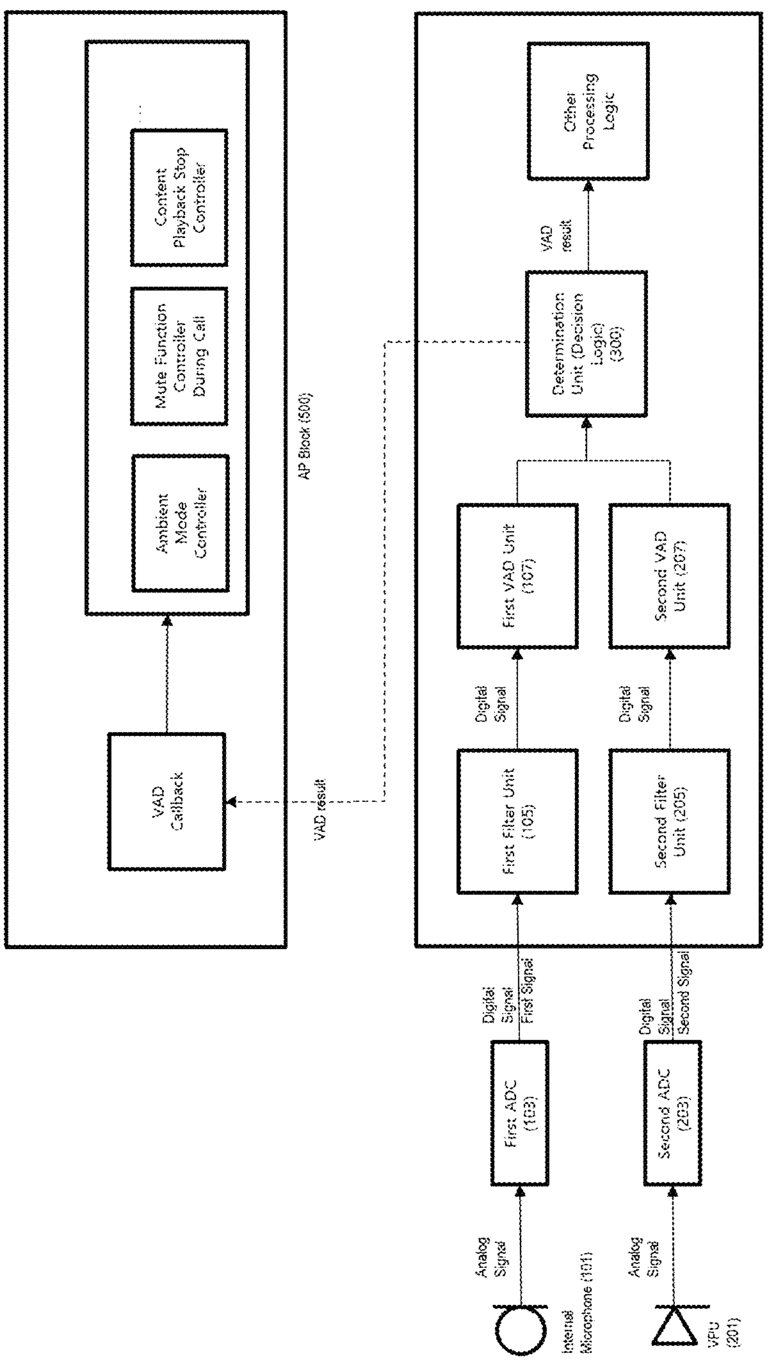
FIG. 5 shows a configuration of an earbud according to an embodiment.

Based on that the determination unit determines that there is utterance, content being played on the earbud may be stopped. This means that a function is supported to automatically pause music and turns on an external sound listening mode when a user utters while listening to the music through earbuds and to automatically turn off an ambient sound listening mode and resume the music when the user does not say anything for a while. When this function is performed, it is important to accurately determine whether the user utters. This is because, when the user does not utter and stops the music repeatedly by misrecognizing other noises as utterance, the user has an unpleasant user experience and does not trust or use the function. FIG. 5 shows an example of a configuration provided in an earbud in this regard. Referring to FIG. 5, the earbud includes a DSP block 400 and an AP block 500, and most of the description of the DSP block 400 is replaced with the description described above with reference to FIG. 1. When the determination result (VAD result) is output from the determination unit 300, the determination result (VAD result) may be input to other processing blocks in the DSP and/or the AP block 500. The determination result (VAD result) input to the AP block 500 may be input to a content playback stop controller, and the playback stop function described above may be initiated. As shown, the AP block 500 may include an ambient mode controller and a mute function controller during a call.

Regarding the mute function Controller during a call, the microphone may be muted based on that the determination unit determines whether there is utterance. This is a function that mutes the microphone when the user does not utter, preventing ambient noise from being transmitted to the other party. As described above, it is also important to accurately determine whether the user utters when this function is performed, which may be obtained through the embodiment described above.

Regarding the ambient mode controller, a volume of the earbud may be lowered to a preset level based on that the determination unit determines that there is utterance. This is a function related to an ambient mode control (ANC) function, for example, gradually reducing the volume of content that is currently played when user utterance is detected. This ANC function also provides only an unpleasant user experience when user utterance is not accurately determined, and thus whether the user utters may be accurately determined according to the embodiment described above.

The first filter unit, the second filter unit, the first VAD unit, the second VAD unit, and the determination unit may be provided in a digital signal processor (DSP) unit, and the DSP may be provided in the earbud. The microphone and the bone conduction VPU sensor may be provided in the earbud.

According to another embodiment, a head-mounted display (HMD) supporting voice activity detection (VAD) is disclosed. The HMD according to an embodiment may include a display unit that provides an image to a user, a wearing unit that allows the display unit to be worn on the head of the user, an earbud that provides a sound related to the image to the user, a first filter unit that filters a first signal input through a microphone, a first VAD unit that performs VAD on a signal passing through the first filter unit, a second filter unit that filters a second signal input through a bone conduction VPU sensor, a second VAD unit that performs VAD on a signal passing through the second filter unit, and a determination unit that compares the detection result of the first VAD unit and the detection result of the second VAD unit to determine whether there is utterance.

Figure 6:
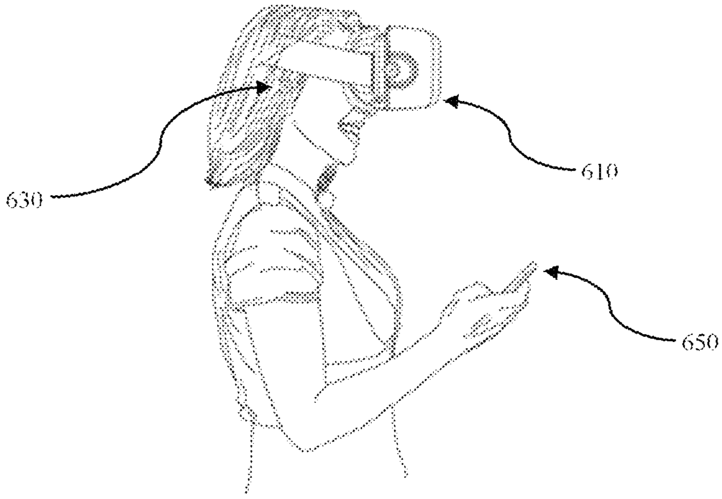
FIG. 6 is a diagram for explaining arrangement of each unit according to an embodiment.
Figure 7:
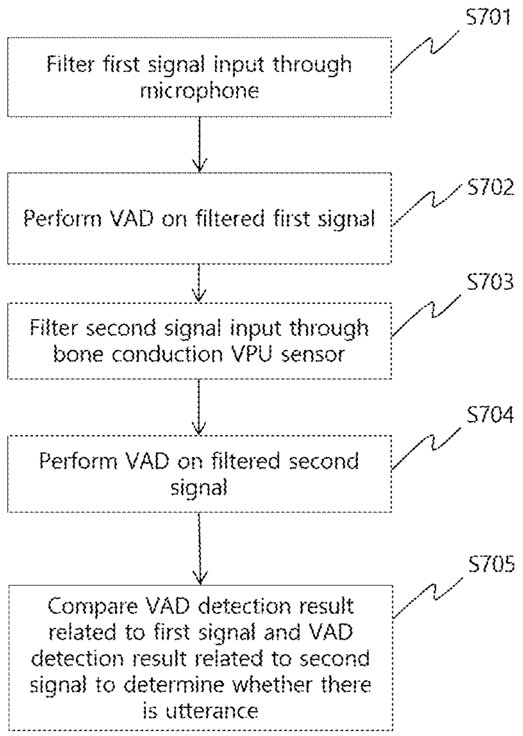
FIG. 7 is a flowchart for explaining a VAD method according to an embodiment.

The first filter unit, the second filter unit, the first VAD unit, the second VAD unit, and the determination unit may be provided in a DSP unit as illustrated in FIGS. 1 to 5, and the DSP unit may be provided in either an HMD 610 or the earbud 630 shown in FIG. 6. The microphone and/or the bone conduction VPU sensor may be provided in the earbud 630 or may be distributed and provided in the HMD 610 and the earbud 630. If necessary, functions/units related to some embodiments may be provided in a portable device 650.

In the above embodiment related to an earbud, each of the units/modules described above in the earbud needs to be built, but the HMD is relatively bulky and has less space constraints, and thus various arrangements other than the built-in arrangement described above may be applied, and combinations of various arrangements of each unit/module are provided in the scope of the present disclosure.

The detailed description related to VAD of the HMD is replaced with the description of the VAD earbud described above.

A method of determining VAD according to an embodiment may include filtering a first signal input through a microphone (S701), performing VAD on the filtered first signal (S702), filtering a second signal input through a bone conduction VPU sensor (S703), performing VAD on the filtered second signal (S704), and comparing the VAD detection result related to the first signal and the VAD detection result related to the second signal to determine whether there is utterance (S705). The detailed description related to the method of determining whether there is utterance is replaced with the description related to the earbud according to the embodiment described above.

Example of XR Device to Which the Present Disclosure is Applied

Figure 8:
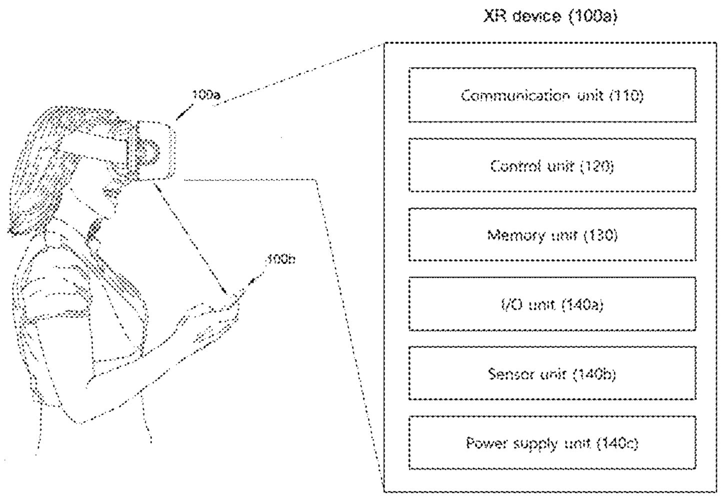
FIG. 8 is a diagram to explain an example of an XR device to be applied to an embodiment.

FIG. 8 illustrates an XR device applied to the present disclosure. The XR devices may be implemented as a head-mounted device (HMD), a head-up display (HUD) installed in a vehicle, a television, a smartphone, a computer, a wearable device, a home appliance, a digital signage, a vehicle, a robot, and the like.

Referring to FIG. 8, an XR device 100*a* may include a communication unit 110, a controller 120, a memory unit 130, an input/output unit 140*a*, a sensor unit 140*b*, and a power supply 140*c*.

The communication unit 110 may transmit and receive signals (e.g., media data or control signals) with external devices such as other wireless devices, mobile devices, or media servers. The media data may include video, images, and sound. The controller 120 may perform various operations by controlling components of the XR device 100*a*. For example, the controller 120 may be configured to control and/or perform procedures such as video/image acquisition, (video/image) encoding, and metadata generation and processing. The memory unit 130 may store data/parameters/programs/codes/commands necessary for driving the XR device 100*a*/generating an XR object. The input/output unit 140*a* may obtain control information, data, and the like from the outside and output the generated XR object. The input/output unit 140*a* may include a camera, a microphone, a user input unit, a display unit, a speaker, and/or a haptic module. The sensor unit 140*b* may obtain an XR device state, surrounding environment information, user information, and the like. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar. The power supply 140*c* may supply power to the XR device 100*a* and may include a wired/wireless charging circuit and a battery.

For example, the memory unit 130 of the XR device 100*a* may include information (e.g., data) necessary for generating an XR object (e.g., AR/VR/MR object). The input/output unit 140*a* may obtain a command to manipulate the XR device 100*a* from the user, and the controller 120 may drive the XR device 100*a* according to the drive command of the user. For example, when the user attempts to watch a movie, news, or the like through the XR device 100*a*, the controller 120 may transmit content request information to another device (e.g., mobile device 100*b*) or a media server through the communication unit 130. The communication unit 130 may download/stream content such as movies and news from another device (e.g., mobile device 100*b*) or a media server to the memory unit 130. The controller 120 may control and/or perform procedures such as video/image acquisition, (video/image) encoding, and metadata generation/processing for the content and generate/output an XR object based on information on a surrounding space or an actual object, obtained through the input/output unit 140*a*/sensor unit 140*b*.

The XR device 100*a* may be wirelessly connected to the mobile device 100*b* through the communication unit 110, and an operation of the XR device 100*a* may be controlled by the mobile device 100*b*. For example, the mobile device 100*b* may operate as a controller for the XR device 100*a*. To this end, the XR device 100*a* may obtain 3D location information of the mobile device 100*b* and then generate and output an XR object corresponding to the mobile device 100*b*.

The above description is merely illustrative of the technical idea of the present disclosure. Those of ordinary skill in the art to which the present disclosure pertains will be able to make various modifications and variations without departing from the essential characteristics of the present disclosure.

Therefore, embodiments disclosed in the present disclosure are not intended to limit the technical idea of the present disclosure, but to describe, and the scope of the technical idea of the present disclosure is not limited by such embodiments. The scope of protection of the present disclosure should be interpreted by the claims below, and all technical ideas within the scope equivalent thereto should be construed as being included in the scope of the present disclosure.

INDUSTRIAL AVAILABILITY

The embodiments described above may be applied to various mobile communication systems.

The invention claimed is:

1. An earbud for supporting voice activity detection (VAD), the earbud comprising:

a first filter unit configured to filter a first signal input through a microphone;

a first VAD unit configured to perform VAD on a signal passing through the first filter unit;

a second filter unit configured to filter a second signal input through a bone conduction voice pick up (VPU) sensor;

a second VAD unit configured to perform VAD on a signal passing through the second filter unit; and a determination unit configured to compare a detection result of the first VAD unit and a detection result of the second VAD unit to determine whether there is utterance, wherein the first filter unit and the second filter unit include a high pass filter (HPF), and wherein a first cutoff frequency of the first filter is higher than a second cutoff frequency of the second filter.

2. The earbud of claim 1, wherein the first VAD unit and the second VAD unit simultaneously detect VAD.

3. The earbud of claim 1, wherein the detection result of the first VAD unit and the detection result of the second VAD unit are either detection of utterance or non-detection of utterance, and the determination unit determines that there is utterance when both the detection result of the first VAD unit and the detection result of the second VAD unit are detection of utterance.

4. The earbud of claim 1, wherein the microphone is muted based on that the determination unit determines that there is no utterance.

5. The earbud of claim 1, wherein, based on that the determination unit determines that there is utterance, content being played on the earbud is stopped.

6. The earbud of claim 1, wherein a volume of the earbud is lowered to a preset level based on that the determination unit determines that there is utterance.

7. The earbud of claim 1, wherein the first filter unit, the second filter unit, the first VAD unit, the second VAD unit, and the determination unit are provided in a digital signal processor (DSP) unit, and the DSP is provided in the earbud.

8. The earbud of claim 1, wherein the microphone and the bone conduction VPU sensor are provided in the earbud.

9. The earbud of claim 1, wherein the first signal includes a digital signal obtained by passing an analog signal input through the microphone through a first ADC, and the second signal includes a digital signal obtained by passing an analog signal input through the bone conduction VPU sensor through a second ADC.

10. A head mounted display (HMD) for supporting voice activity detection (VAD), the HMD comprising:

a display unit configured to provide an image to a user;

a wearing unit configured to allow the display unit to be worn on a head of a user;

an earbud configured to provide a sound related to the image to the user;

a first filter unit configured to filter a first signal input through a microphone;

a first VAD unit configured to perform VAD on a signal passing through the first filter unit;

a second filter unit configured to filter a second signal input through a bone conduction voice pick up (VPU) sensor;

a second VAD unit configured to perform VAD on a signal passing through the second filter unit; and a determination unit configured to compare a detection result of the first VAD unit and a detection result of the second VAD unit to determine whether there is utterance, wherein the first filter unit and the second filter unit include a high pass filter (HPF), and wherein a first cutoff frequency of the first filter is higher than a second cutoff frequency of the second filter.

11. The HMD of claim 10, wherein the first filter unit, the second filter unit, the first VAD unit, the second VAD unit, and the determination unit are provided in a DSP unit, and the DSP unit is provided in either the HMD or the earbud.

12. The HMD of claim 11, wherein the microphone and the bone conduction VPU sensor are provided in the earbud.

13. The HMD of claim 10, wherein the first VAD unit and the second VAD unit simultaneously detect VAD.

14. The HMD of claim 10, wherein the detection result of the first VAD unit and the detection result of the second VAD unit are either detection of utterance or non-detection of utterance, and the determination unit determines that there is utterance when both the detection result of the first VAD unit and the detection result of the second VAD unit are detection of utterance.

15. The HMD of claim 10, wherein, based on that the determination unit determines that there is utterance, content being played on the earbud is stopped.

16. The HMD of claim 10, wherein the microphone is muted based on that the determination unit determines that there is no utterance.

17. The HMD of claim 10, wherein, the first filter unit, the second filter unit, the first VAD unit, the second VAD unit, and the determination unit are provided in a digital signal processor (DSP) unit, and the DSP is provided in the earbud.

18. The HMD of claim 10, wherein a volume of the earbud is lowered to a preset level based on that the determination unit determines that there is utterance.

19. A method of determining voice activity detection (VAD), the method comprising:

filtering a first signal input through a microphone;

performing VAD on the filtered first signal;

filtering a second signal input through a bone conduction voice pick up (VPU) sensor;

performing VAD on the filtered second signal; and comparing a VAD detection result related to the first signal and a VAD detection result related to the second signal to determine whether there is utterance, wherein each of the filtering of the first signal and the filtering of the second signal is performed based on a respective high pass filter (HPF), and wherein a first cutoff frequency of the high-pass filter for the first signal is higher than a second cutoff frequency of the high-pass filter for the second signal.

* * * * *